C. J. MELLIN.
FLEXIBLE BALL JOINT.
APPLICATION FILED OCT. 6, 1904.
908,414.
Patented Dec. 29, 1908.
2 SHEETS—SHEET 1.
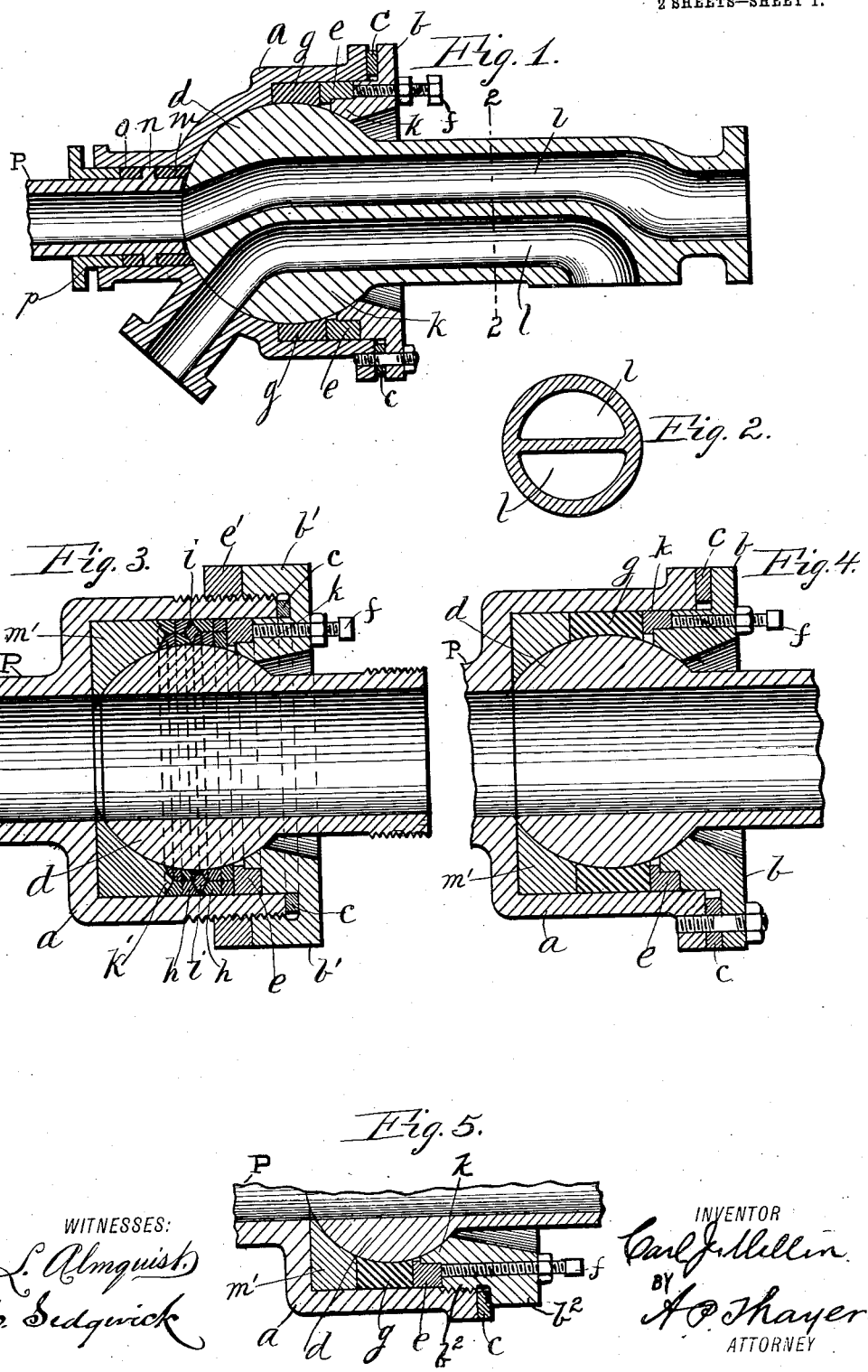

C. J. MELLIN.
FLEXIBLE BALL JOINT.
APPLICATION FILED OCT. 6, 1904.

908,414.

Patented Dec. 29, 1908.
2 SHEETS—SHEET 2.

WITNESSES:
L. Almquist
C. Sedgwick

INVENTOR
Carl J. Mellin
BY
A. P. Thayer.
ATTORNEY

UNITED STATES PATENT OFFICE.

CARL J. MELLIN, OF SCHENECTADY, NEW YORK, ASSIGNOR TO AMERICAN LOCOMOTIVE COMPANY, OF NEW YORK, N. Y., A CORPORATION OF NEW YORK.

FLEXIBLE BALL-JOINT.

No. 908,414.

Specification of Letters Patent.

Patented Dec. 29, 1908.

Application filed October 6, 1904. Serial No. 227,345.

*To all whom it may concern:*

Be it known that I, CARL J. MELLIN, a citizen of the United States of America, and a resident of Schenectady, county of Schenectady, and State of New York, have invented certain new and useful Improvements in Flexible Ball-Joints, of which the following is a specification.

My invention relates to flexible pipe joints and has for its object to provide simple and reliable constructions for single or multiple passages, whereby the joint can be packed and the wear can be taken up, as a cylindrical pipe joint, without disturbing the rigidly located gland by which the ball is held in place in its casing, as hereinafter described reference being made to the accompanying drawings in which:—

Figure 6:
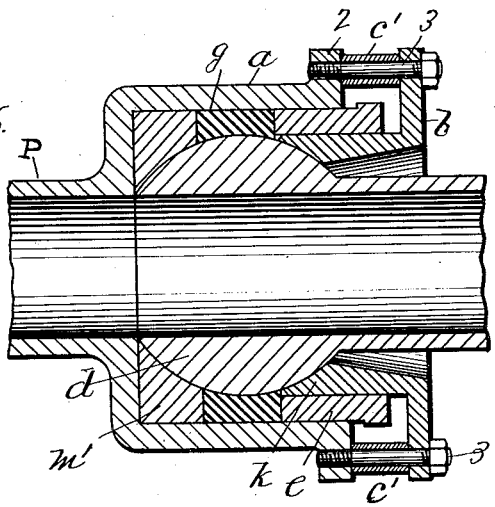
Figure 7:
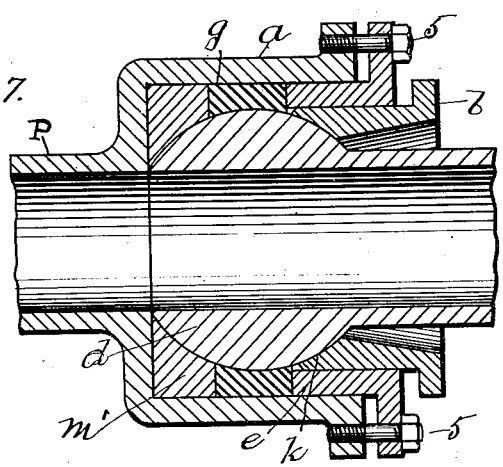
Figure 8:
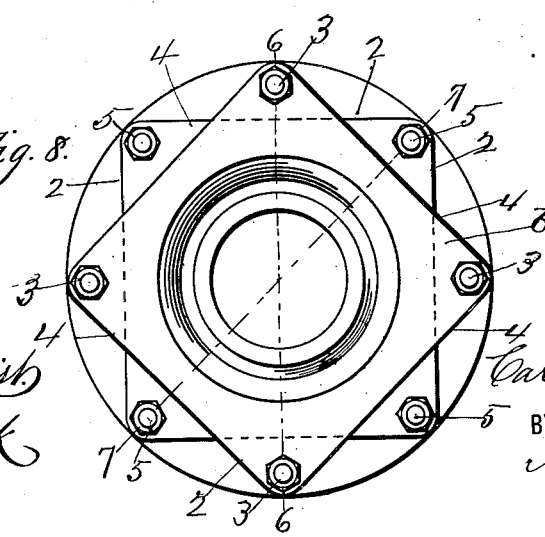

Figure 1, is a longitudinal section of my improved pipe joint. Fig. 2, is a transverse section on line 2—2 of Fig. 1. Fig. 3, is a longitudinal section showing a slight modification. Fig. 4, is a longitudinal section showing another modification. Fig. 5, is a detail in longitudinal section showing another modification. Fig. 6, is a central longitudinal section on line 6—6 of Fig. 8, showing a modified arrangement for actuating the packing compressing ring or follower. Fig. 7, is a central longitudinal section on line 7—7 of Fig. 8 illustrative of said modification of Fig. 6. Fig. 8, is a front elevation of the modifications represented in Figs. 6 and 7.

The ball receiving case $a$ is fitted for reception of a gland $b$ preferably with a distance piece $c$ between the flanges of said case and gland, but washers or thimbles $c'$ may be used, said distance piece, washers or thimbles being prepared as to thickness in advance of the assembling of the parts to secure the ball $d$ without jamming at $k$ when the gland is screwed "home", and the wear of the ball and gland will be taken up when needed by thinning off the said distance piece, washers or thimbles, but the gland may be applied without such distance pieces. The gland being fitted to be rigidly adjusted to place is not otherwise adjustable without being first removed and refitted.

Within the gland $b$ is a follower or compression ring $e$ with which adjusting screws as $f$, or other equivalent means, are provided for taking up the wear of packing from time to time, said packing surrounding the ball between the follower and the bottom bearing ring $m'$ and said packing consisting of fibrous material $g$, or metallic or hard fibrous rings $h$ with, in the latter case, a middle ring $i$ of diamond shaped cross-section to spread the others, and preferably with a beveled faced bottom ring $k'$ for the same purpose, but the packing may be of any approved kind and form. The follower $e$ may have any suitable form of cross-section of the side bearing against the packing with corresponding shape of the packing rings, when they are of metallic construction. For packing against the end of the ball I provide a "Vulcabeston" ring $m$ of hard fiber or other suitable material to pack steam-tight against said ball and preferably against a shoulder $n$ of the pipe with or without an intervening packing, but the shoulder may be omitted and the ring $m$ may be backed by the ordinary stuffing box packing $o$.

P represents a fragment of any pipe or tube which may be either stationary or movable and in connection with which the ball is designed to operate.

A bottom packing ring $m'$ may be used in the ball case and in such cases the packing of the neck of the case by the ring $m$ may be omitted as in Figs. 3-7 inclusive.

The gland $b$ may be bolted on the ball receiving case in the usual manner as in Figs. 1 and 2 or it may be screw-threaded on the outside of the ball case as $b'$ with or without a check-nut $e'$ as in Fig. 3, or it may be screw-threaded inside as at $b^2$ Fig. 5.

In Figs. 1 and 2 I represent a pipe with two passages $l$ which may be useful in some cases, and to which the invention is alike applicable.

By truncating the flange of the follower $e$ as at 2 to provide clearance for the gland adjusting bolts 3, and also truncating the flange of gland $b$ as at 4 for clearance of the follower adjusting bolts, the bolts for both the follower and the gland may be set in the case flanges.

What I claim as my invention is:—

1. In a flexible ball joint, the combination with the ball case, of the ball having its inner and outer bearings and a plurality of passages through the ball and the neck with corresponding passages in the case, and independent packings for the pipes connected with said case, one part of the pipe packing being arranged to bear against the ball.

2. In a flexible ball joint, the combination of the ball receiving case, the ball, bearings, packing between said bearings, packing compressing ring, a passage through the ball and casing being provided, a pipe connected with said casing, and an independent packing surrounding the pipe and bearing against the ball.

3. In a flexible ball joint the combination of a ball, a ball casing, a gland, an inner bearing for the ball integral with the casing, an outer bearing for the ball integral with the gland, a distance piece between the casing and the gland, packing for said ball, a compression ring for said packing and means independent of said distance piece for adjusting said ring.

4. In a flexible ball joint, the combination of a ball, a casing for the ball, a gland fitting in said casing an inner bearing for the ball integral with said casing, an outer bearing for the ball integral with said gland, packing for said ball, a compression ring for said packing and a distance piece between said casing and said gland.

5. In a flexible ball joint the combination of a ball, a casing for the ball, a gland fitting in said casing, an inner bearing for the ball integral with said casing, an outer bearing for the ball integral with said gland, means separate from said casing and said gland for preventing said bearings from jamming said ball, packing for the ball, and a compression ring for said packing.

6. In a flexible ball joint the combination of a ball, a casing for the ball, a gland fitting in said casing, an inner bearing for the ball integral with said casing, an outer bearing for the ball integral with said gland, means separate from said casing and said gland for preventing said bearings from jamming said ball, packing for the ball, and a compression ring for said packing adjustable independently of said gland.

7. In a flexible ball joint, the combination of a ball, a casing for the ball, a gland fitting in said casing, an inner bearing for the ball integral with said casing, an outer bearing for the ball integral with said gland, a distance piece between said casing and said gland to prevent said bearings from jamming the ball, packing for the ball between said casing and said gland, and a compression ring for said packing.

8. In a flexible ball joint, the combination of a ball, a casing for the ball, a gland fitting in said casing, an inner bearing for the ball integral with said casing, an outer bearing for the ball integral with said gland, a distance piece between said casing and said gland to prevent said bearings from jamming the ball, packing for the ball between said casing and said gland, and a compression ring for said packing surrounding said gland and adjustable independently of said gland.

9. In a flexible ball joint, the combination of a ball provided with a passage therethrough, a casing for the ball, a gland, an inner bearing for the ball integral with the casing, an outer bearing for the ball integral with the gland, a pipe connected to said casing and communicating with said passage and packing surrounding said pipe and bearing against said ball.

10. In a flexible ball joint, the combination of a ball provided with a passage therethrough, a casing for the ball, a gland fitting in said casing, an inner bearing for the ball integral with the casing, an outer bearing for the ball integral with the gland, a pipe connected to said casing and communicating with said passage and packing surrounding said pipe and bearing against said ball.

11. In a flexible ball joint, the combination of a ball provided with a passage therethrough, a casing for the ball, a gland upon one side of said casing, a pipe connected to the other side of said casing and communicating with said passage, packing between said casing and said gland, and packing surrounding said pipe and bearing against said ball.

12. In a flexible ball joint, the combination of a ball provided with a passage therethrough, a casing for the ball, a gland upon one side of said casing and fitting in said casing, a pipe connected to the other side of casing and communicating with said passage, packing between said casing and said gland, and packing surrounding said pipe and bearing against said ball.

13. In a flexible ball joint, the combination of a ball provided with a plurality of passages therethrough, a casing for the ball having a plurality of openings communicating with said passages, a gland on one side of said casing, and packing between said openings and said gland.

14. In a flexible ball joint, the combination of a ball provided with a plurality of passages therethrough, a casing for the ball having a plurality of openings communicating with said passages, a gland on one side of said casing, and packing between said openings and said gland, a pipe connected to said casing in one of said openings and packing surrounding said pipe and bearing against said ball.

15. In a flexible ball joint, the combination of a ball having a plurality of passages therethrough, a casing for said ball having a plurality of openings communicating with said passages respectively, a pipe in one of said openings and packing surrounding said pipe.

16. In a flexible ball joint, the combination of a ball having a plurality of passages therethrough, a casing for said ball having a plurality of openings communicating with said passages respectively, a pipe in one of said openings and packing surrounding said pipe and bearing against said ball.

Signed at New York this 26th day of September, 1904.

CARL J. MELLIN.

Witnesses:
C. SEDGWICK,
J. M. HOWARD.